(12) United States Patent
Ryan

(10) Patent No.: US 10,251,510 B2
(45) Date of Patent: *Apr. 9, 2019

(54) COFFEE MAKING APPARATUS WITH A FROTH SPOON AND AT LEAST ONE IMPELLER

(71) Applicant: RYAN BROTHERS COFFEE OF SAN DIEGO, INC., San Diego, CA (US)

(72) Inventor: Harry Ryan, San Diego, CA (US)

(73) Assignee: RYAN BROTHERS COFFEE OF SAN DIEGO, INC., San Diego, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 15/596,670

(22) Filed: May 16, 2017

(65) Prior Publication Data

US 2018/0064284 A1 Mar. 8, 2018

Related U.S. Application Data

(63) Continuation-in-part of application No. 15/259,666, filed on Sep. 8, 2016, now Pat. No. 9,648,979.

(51) Int. Cl.
| | |
|---|---|
| A47J 31/38 | (2006.01) |
| A47J 31/44 | (2006.01) |
| A47J 31/20 | (2006.01) |
| A47J 31/46 | (2006.01) |
| A47J 31/36 | (2006.01) |

(52) U.S. Cl.
CPC .......... *A47J 31/4496* (2013.01); *A47J 31/20* (2013.01); *A47J 31/38* (2013.01); *A47J 31/4407* (2013.01); *A47J 31/46* (2013.01); *A47J 31/36* (2013.01)

(58) Field of Classification Search
CPC .... A47J 31/4496; A47J 31/38; A47J 31/4407; A47J 31/46; A47J 31/36
USPC ...................................... 99/297, 287, 302 P
See application file for complete search history.

(56) References Cited

U.S. PATENT DOCUMENTS

| | | | |
|---|---|---|---|
| 4,365,544 A * | 12/1982 | Howitt | ............... A47J 31/20 99/297 |
| 6,231,909 B1 | 5/2001 | Levinson | |
| 6,422,133 B1 | 7/2002 | Brady | |
| 7,040,218 B1 | 5/2006 | Biolchini et al. | |
| D557,978 S | 12/2007 | Bodum | |
| 7,437,990 B2 | 10/2008 | Duch | |

(Continued)

FOREIGN PATENT DOCUMENTS

WO 2008/044948 A1 4/2008

OTHER PUBLICATIONS

European Search Report received from EP Application Serial No. 17189944.6-1006, dated Apr. 17, 2018, 12 pages.

*Primary Examiner* — Reginald Alexander
(74) *Attorney, Agent, or Firm* — Arc IP Law, PC; Joseph J. Mayo

(57) ABSTRACT

Enables a coffee making apparatus with a froth spoon and at least one impeller configured to enable users to make a cup of coffee, agitate the coffee grounds with the at least one impeller, for example before or after as the plunger is pushed to the bottom of the carafe. Embodiments thus enable a user to make additional froth, pour out the coffee into a cup, and after the cup is filled to the desired level, spoon out froth over the coffee with the froth spoon without pouring excess coffee into the cup.

20 Claims, 5 Drawing Sheets

(56) References Cited

U.S. PATENT DOCUMENTS 9,192,261 B2 11/2015 Katz et al.
2016/0227960 A1 8/2016 DellaContrada et al.

* cited by examiner

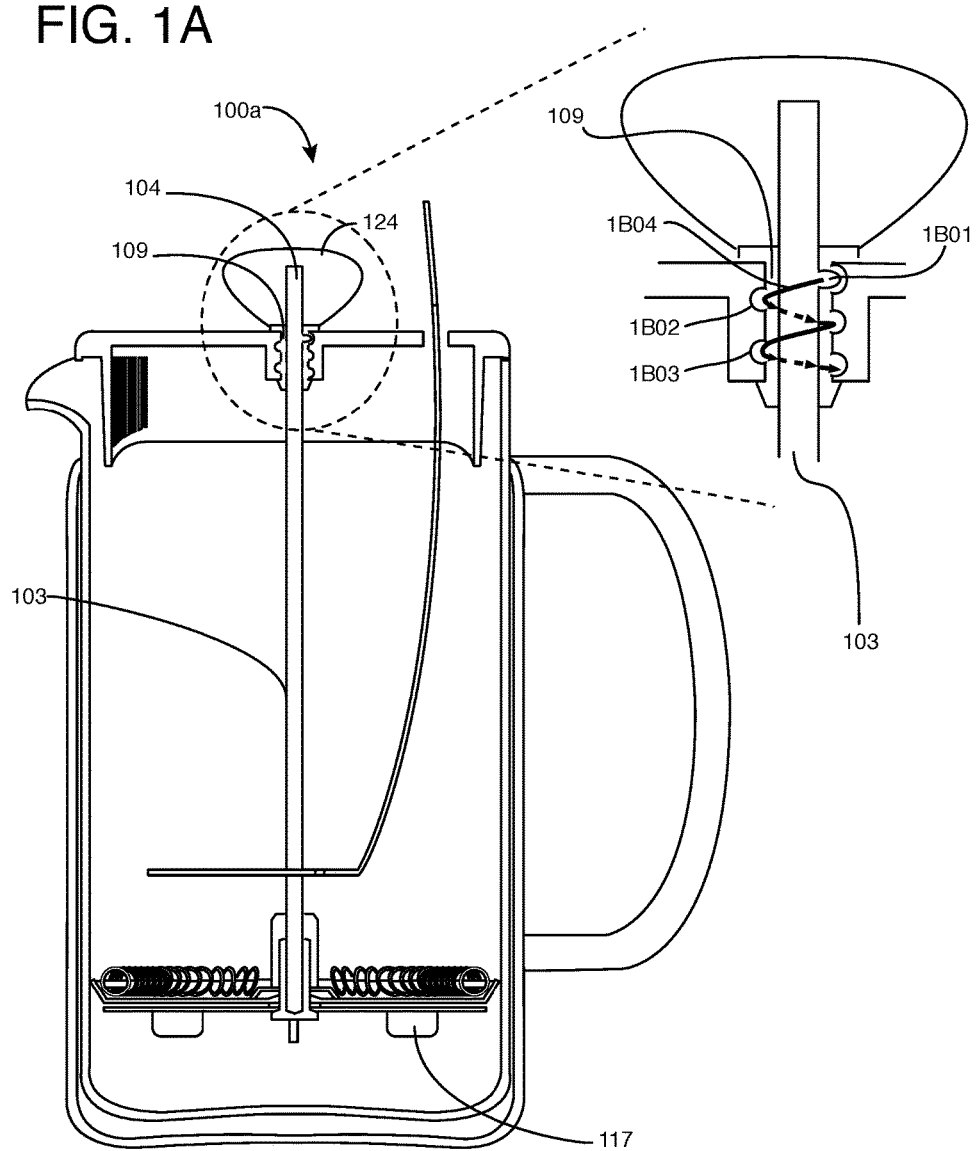

COFFEE MAKING APPARATUS WITH A FROTH SPOON AND AT LEAST ONE IMPELLER

This application is a continuation-in-part of U.S. Utility patent application Ser. No. 15/259,666 filed 8 Sep. 2016, issued as U.S. Pat. No. 9,648,979 on 16 May 2017, the specification of which is hereby incorporated herein by reference.

BACKGROUND OF THE INVENTION

Field of the Invention

One or more embodiments of the invention are related to the field of making coffee. More particularly, but not by way of limitation, one or more embodiments of the invention enable a coffee making apparatus, for example a French press, with a froth spoon and at least one impeller. Embodiments enable a user to make a carafe of coffee with froth, otherwise known as foam or crema, utilizing at least one impeller to agitate the grinds creating froth or crema, and pulling the top captured crema with a froth spoon out of the carafe into the cup prior to pouring any liquid which would otherwise collapse the froth or crema.

Description of the Related Art

Current French presses for making coffee or espresso drinks cannot agitate coffee grounds, for example by rotating the plunger since the bottom of the filter on the plunger is generally flat. Hence, when the plunger is pressed, there is no way to create additional froth. Even if these French presses could create additional froth, they do not include a froth spoon and they are unable to remove the froth from the carafe without pouring additional coffee into an already filled cup.

Current solutions for creating additional froth include heating an additional amount of coffee externally from the coffee pot or making coffee in a machine that is designed to brew coffee that require spooning out the froth after the cup of coffee is made. Alternatively, or an expensive espresso machine is required to make a small amount of espresso and crema. These solutions are limited in that either an additional amount of coffee is needed outside of the coffee pot or an expensive and bulky machine is needed.

Making coffee in a machine also frequently burns the coffee and subjects the coffee to excessive pressure. The pressure used to force the hot water through the coffee grounds is commonly 130 psi, but can be as much as 250 psi. This pressure, limits the amount of froth that can be made during the coffee making process and can leave the coffee with an undesirable taste, especially when the temperature of the water forced through coffee is high enough to break down complex fragrant aromatic compounds in the coffee.

For at least the limitations described above there is a need for a coffee making apparatus with a froth spoon and at least one impeller that enables a user to make coffee, concentrated espresso coffee with froth, foam or crema for example without the need for an expensive electric espresso machine or separate frothing machine.

BRIEF SUMMARY OF THE INVENTION

One or more embodiments described in the specification are related to a coffee making apparatus with a froth spoon and at least one impeller. Specifically, embodiments of the invention include an apparatus to make coffee and froth that includes a carafe having an interior surface and an exterior surface, plunger shaft having a top end and a bottom end, lid having a lid notch, lid mouth, and a hole, a froth spoon having at least a semioval plate, a shaft having a top end and a bottom end, a cross plate having a top side and a bottom side with at least one impeller, a filter screen, a perforated plate and a spring. The froth spoon is coupled or otherwise configured to travel along or parallel to the plunger shaft. The plunger shaft protrudes through the hole in the lid. The semioval plate of the froth spoon is configured to fit within the interior surface of the carafe. In one or more embodiments the froth spoon plate may be circular or any fraction of a circle, hence the term semioval as utilized herein is not intended to limit the invention. The froth spoon is configured to move vertically with respect to the carafe when the plunger shaft is moved vertically.

In one or more embodiments of the invention, the hole in the lid, or the plunger shaft, may have a helical feature that mates with a corresponding feature on the shaft or the lid, respectively. These mating features enable the plunger shaft to rotate when it is moved up and down with respect to the carafe. For example, the hole may have a helical groove, and the plunger shaft may have a peg or one or more other protrusions, such as a mating helical shape that engages the helical feature in the hole, e.g., that follows the helical groove in the hole in the lid to rotate the shaft as it moves up and down. In other embodiments, the hole may be implemented with a peg or other feature that engages the helical feature on the plunger shaft. Any angle or pitch of helix may be utilized so long as a downward or upward force along the axis defined by the plunger shaft enables the plunger shaft to rotate about that axis.

Embodiments of the invention enable a user to agitate the contents of the carafe with the at least one impeller to create the froth, also known as foam or crema, and spoon the froth, out first and then pour any remaining coffee into the cup. If the froth is not removed first, the coffee liquid collapses the froth while exiting the carafe through the froth.

In one or more embodiments of the invention, the carafe is an elongated cylinder. In one or more embodiments other shapes may be utilized. In these embodiments, the froth spoon plate may be of the same shape as the carafe, or any fraction thereof.

In one or more embodiments of the invention, the carafe has a spout to empty the contents of the carafe. Embodiments of the invention do not require a spout however.

In one or more embodiments of the invention, the cross plate further comprises at least one impeller that is oriented in a direction other than parallel to the plane of the cross plate. In one or more embodiments, the cross plate includes a plurality of impellers. Embodiments of the invention may utilize any number of impellers to agitate the coffee, and to generate more froth or otherwise increase the mixing of the coffee and water for example.

In one or more embodiments of the invention, the plunger shaft is configured to move vertically with respect to the carafe through the hole in the lid. In one or more embodiments of the invention, the plunger shaft is threaded on the bottom end and has a grip on the top end. In one or more embodiments of the invention, the plunger shaft is configured to rotate horizontally with respect to the carafe to allow the plurality of impellers to agitate the contents of the carafe.

In one or more embodiments of the invention, the lid closely seals on top of the carafe to keep contents, i.e., coffee and water, inside of the carafe during use.

In one or more embodiments of the invention, the froth spoon further comprises a slit to allow the froth spoon to be removed from the plunger shaft. In one or more embodiments of the invention, the froth spoon further comprises a central hole to allow the froth spoon to move vertically on the plunger shaft. In one or more embodiments of the invention, the plunger shaft further comprises a shoulder and a retention nut that hold the cross plate, the filter screen, and the perforated plate together on the bottom end of the plunger shaft.

In one or more embodiments of the invention, the carafe is held by a sleeve made of an insulative material shaped to conform to the exterior surface of the cylindrical carafe with a handle that closely fits around the carafe.

In one or more embodiments of the invention, the spring compresses the filter screen against the interior surface of the cylindrical carafe to keep coffee grounds in the bottom portion of the carafe when the coffee is poured out.

Embodiments of the invention enable the extra forth generated by agitating the coffee and water mixture by rotating the plunger shaft to be removed by moving the froth spoon along the axis defined by the plunger shaft. By moving the plunger shaft, the apparatus enables a user to pull froth out of the carafe without pouring excess coffee into a coffee cup for example.

BRIEF DESCRIPTION OF THE DRAWINGS

The above and other aspects, features and advantages of the invention will be more apparent from the following more particular description thereof, presented in conjunction with the following drawings wherein:

FIG. 1A illustrates an embodiment of the coffee making apparatus with a spiral groove in which a peg on the plunger shaft rotates, thereby spinning the impeller when the plunger is moved up or down.

FIG. 1B shows a close-up view of the spiral groove and plunger shaft peg of the embodiment of FIG. 1A.

DETAILED DESCRIPTION OF THE INVENTION

A coffee making apparatus with a froth spoon and one or more impellers will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
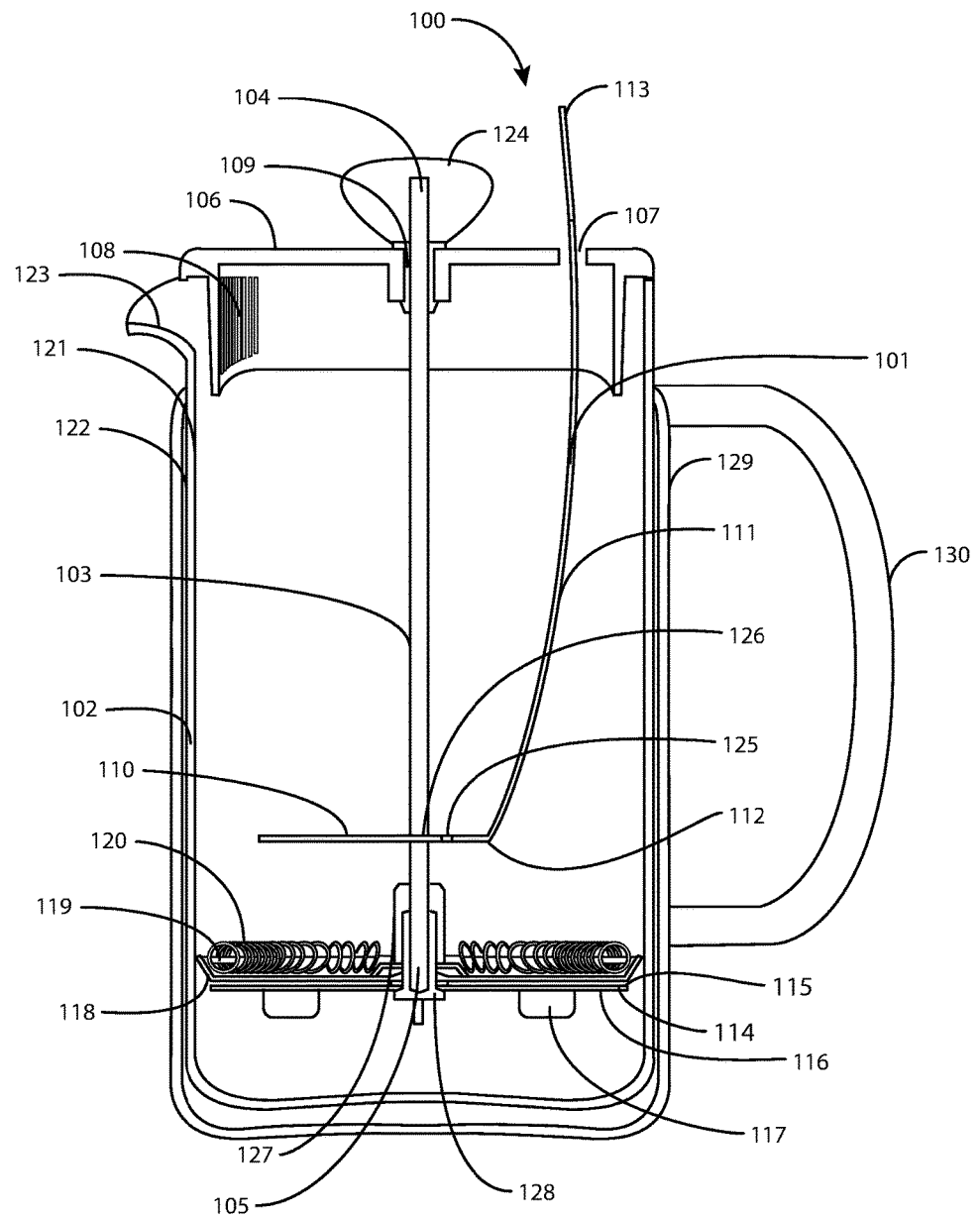
FIG. 1 illustrates a perspective view of at least one embodiment of the coffee making apparatus with froth spoon and at least one impeller.

FIG. 1 shows a perspective view of apparatus 100 that is configured to make coffee and froth that includes a froth spoon 101, carafe 102 with an interior surface 121 and an exterior surface 122, plunger shaft 103 with a top end 104 and a bottom end 105, lid 106, lid notch 107, lid mouth 108, and hole 109. Froth spoon 101 includes semioval plate 110, shaft 111, bottom end 112, top end 113. Plunger shaft 103 couples with cross plate 114 with a top side 115 and a bottom side 116. The cross plate couples with or otherwise includes at least one impeller 117. The cross plate touches or otherwise couples with filter screen 118, perforated plate 119 and spring 120. The carafe includes spout 123, while plunger shaft couples with or otherwise includes grip 124. The froth spoon may include slit 125, and/or a central hole 126 to enable the froth spoon to disengage from plunger shaft 103 for cleaning and/or in the case of embodiments with a central hole, to move up and down the plunger shaft to enable removal of froth. Embodiments of the invention may utilize shoulder 127 and retention nut 128 to couple the cross plate, filter screen and perforated plate to the plunger shaft for example. Embodiments may also utilize an insulating outer member to protect the user from the hot carafe, namely sleeve 129, and embodiments generally include handle 130.

One or more embodiments may include a feature or features that cause the impeller to spin when the plunger shaft is moved up or down. FIGS. 1A and 1B illustrate an embodiment 100a that has a spiral groove in hole 109. (FIG. 1B is a close-up view of the top 104 of plunger shaft 103 and of the hole 109 through which the plunger shaft fits.) For example, in the cross-sectional view of hole 109 shown in FIG. 1B, grooves 1B02 and 1B03 are shown on the left side of the hole; similar grooves are shown on the right side of the hole. The grooves in hole 109 form a continuous spiral or helical pattern in the inner surface of the hole. Plunger shaft 103 has a protruding peg 1B01 that fits into these grooves and that follows the groove pattern as the plunger shaft is moved up or down. This mating of peg 1B01 with the groove pattern in hole 109 causes the peg 1B01 to rotate in a roughly helical trajectory 1B04 as the shaft is moved up or down, thereby rotating the plunger shaft. This rotation of the plunger shaft causes impeller 117 to rotate.

In one or more embodiments, any type of mating spiral features on shaft 103 and hole 109 may cause rotation of the shaft as it is moved up or down in the hole. For example, a screw pattern of ridges or indentations may be integrated into or attached to plunger shaft 103, and corresponding mating features may be integrated into or attached to the inner surface of hole 109. In one or more embodiments shaft 103 may have grooves, and the inner surface of hole 109 may have a peg or other protrusions (such as for example a screw pattern) that mate with the grooves on the shaft. Any type of mating features on shaft 103 and hole 109 that cause rotation of the shaft as it moves up or down is in keeping with the spirit of the invention.

Figure 2:
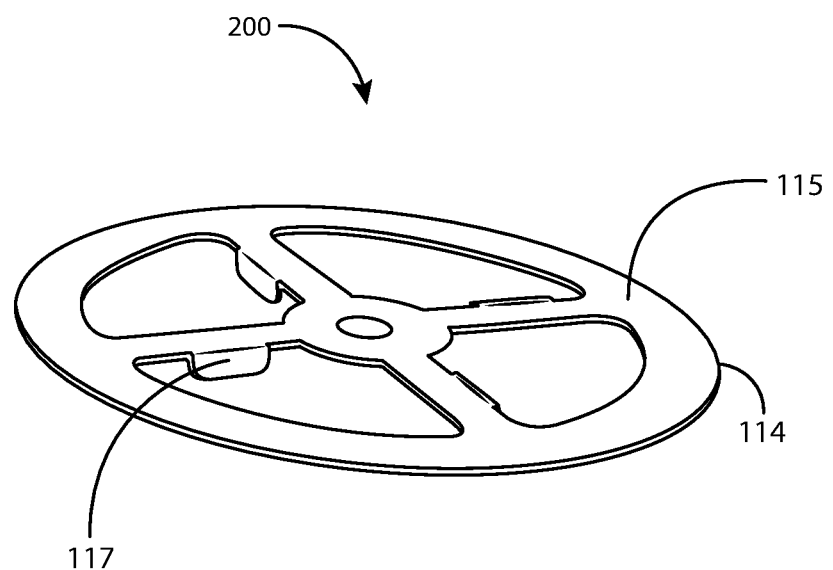
FIG. 2 illustrates a perspective view of the cross plate.

FIG. 2 illustrates a perspective view of the cross plate 114. As shown, the top side 115 of the cross plate 114 is visible with at least one impeller 117 protruding from the bottom side. Embodiments of the impellers can be of any shape so long as the at least one impeller deviates from the plane defined by the cross plate. As shown, embodiments of the at least one impeller 117 extend downward from the cross plate to enable rotation of the plunger shaft to affect the mixing of the coffee in the bottom portion of the carafe.

Figure 3:
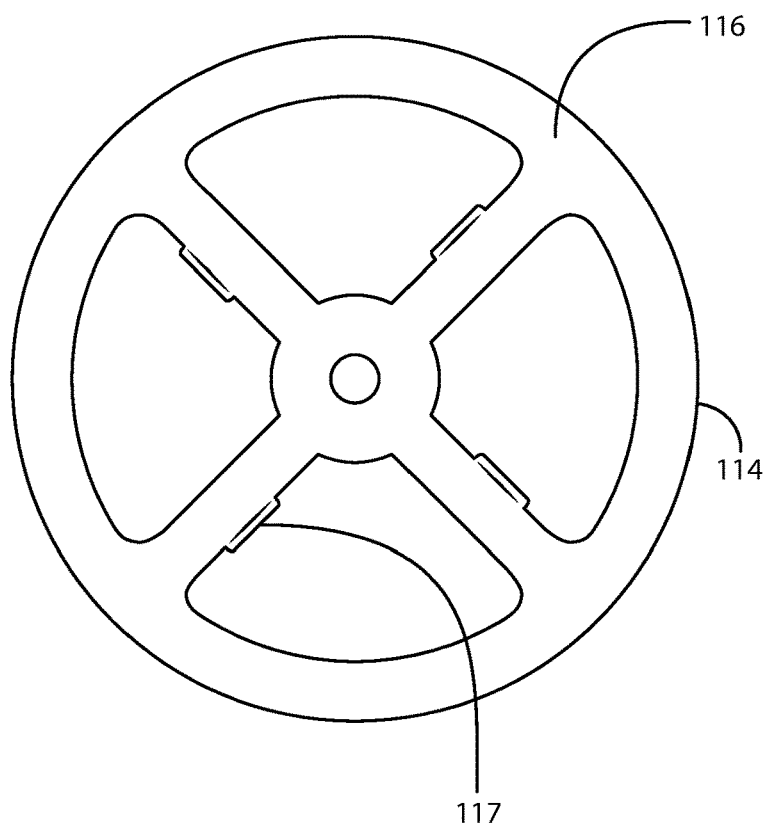
FIG. 3 illustrates a bottom view of the cross palate.

FIG. 3 illustrates a bottom view of the cross plate 114 with the at least one impeller 117 protruding from the bottom side 116 of the cross plate. Any angle or size of impeller may be utilized in embodiments of the invention so long as the at least one impeller is capable of mixing the contents of the bottom of the carafe when the plunger shaft is rotated about the axis defined by the plunger shaft.

Figure 4:
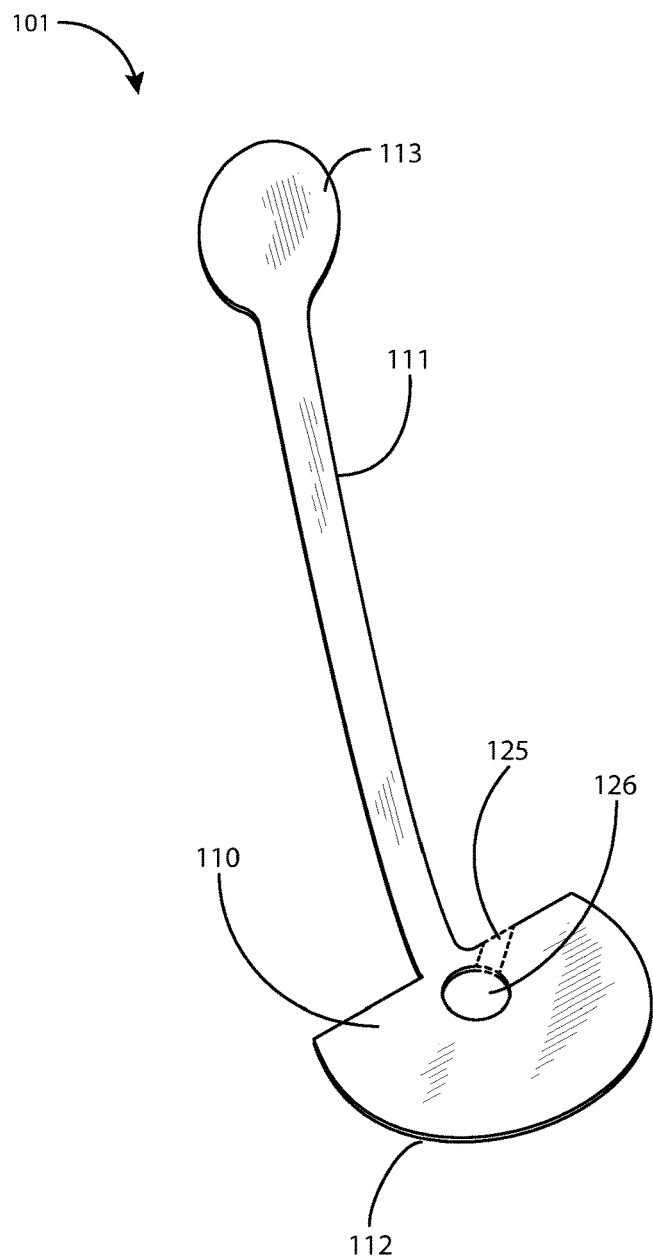
FIG. 4 illustrates a perspective view of the forth spoon.

FIG. 4 illustrates a perspective view of the froth spoon 101, semioval plate 110, shaft 111 with the bottom end 112 and the top end 113, slit 125, and central hole 126. Embodiments of the invention may be configured with slit 125 to enable the froth spoon to be disengaged from the plunger shaft, for example to enable cleaning. In one or more embodiments a central hole enables the froth spoon to travel up and down the plunger shaft.

While the invention herein disclosed has been described by means of specific embodiments and applications thereof, numerous modifications and variations could be made thereto by those skilled in the art without departing from the scope of the invention set forth in the claims.

What is claimed is:

1. A coffee making apparatus with a froth spoon and at least one impeller comprising:
    a carafe having an interior surface and an exterior surface;
    a lid having a lid notch, a lid mouth, and a hole;
    a plunger shaft having a top end and a bottom end;
        wherein the hole or the plunger shaft has a helical feature that mates with a corresponding feature of the plunger shaft or of the hole, respectively;
        wherein the helical feature and the corresponding feature are configured to rotate the plunger shaft when the plunger shaft moves up or down with respect to the lid;
    a froth spoon having
        at least a semi-oval plate coupled with the plunger shaft, and
        a shaft having a top end and a bottom end;
            wherein the plunger shaft protrudes through the hole in the lid;
            wherein the semi-oval plate is configured to fit within the interior surface of the carafe; and
            wherein the froth spoon is configured to move vertically with respect to the carafe when the plunger shaft is moved vertically;
    a cross plate having a top side, a bottom side, and at least one impeller;
        wherein the at least one impeller protrude from the bottom side of the cross plate;
    a spring;
    a filter screen coupled with the cross plate and further coupled with the spring to provide
        a seal between the filter screen and the carafe; and
    a perforated plate coupled with the filter screen.

2. The coffee making apparatus with a froth spoon and at least one impeller of claim 1, wherein the carafe is an elongated cylinder.

3. The coffee making apparatus with a froth spoon and at least one impeller of claim 1, wherein the carafe further comprises a spout to empty contents of the carafe.

4. The coffee making apparatus with a froth spoon and at least one impeller of claim 1, wherein the at least one impeller comprises a plurality of impellers.

5. The coffee making apparatus with a froth spoon and at least one impeller of claim 1, wherein the plunger shaft is configured to move vertically with respect to the carafe through the hole in the lid.

6. The coffee making apparatus with a froth spoon and at least one impeller of claim 1, wherein the plunger shaft is threaded on the bottom end and has a grip on the top end.

7. The coffee making apparatus with a froth spoon and at least one impeller of claim 1, wherein the plunger shaft is configured to rotate horizontally with respect to the carafe to allow the at least one impeller to agitate contents of the carafe.

8. The coffee making apparatus with a froth spoon and at least one impeller of claim 1, wherein the lid seals on top of the carafe to keep contents inside of the carafe during use.

9. The coffee making apparatus with a froth spoon and at least one impeller of claim 1, wherein the froth spoon further comprises a slit to allow the froth spoon to be removed from the plunger shaft.

10. The coffee making apparatus with a froth spoon and at least one impeller of claim 1, wherein the froth spoon further comprises a central hole to allow the froth spoon to move vertically along the plunger shaft.

11. The coffee making apparatus with a froth spoon and at least one impeller of claim 1, wherein the plunger shaft further comprises a shoulder and a retention nut that hold the cross plate, the filter screen, and the perforated plate together on the bottom end of the plunger shaft.

12. The coffee making apparatus with a froth spoon and at least one impeller of claim 1, wherein the carafe is held by a sleeve made of an insulative material shaped to conform to the exterior surface of the carafe with a handle, that closely fits around the carafe.

13. The coffee making apparatus with a froth spoon and at least one impeller of claim 1, wherein the spring compresses the filter screen against the interior surface of the carafe.

14. A coffee making apparatus with a froth spoon and at least one impeller comprising:
    a carafe having an interior surface and an exterior surface wherein the carafe is an elongated cylinder and wherein the carafe further comprises a spout to empty contents of the carafe;
    a lid having a lid notch, a lid mouth, and a hole;
    a plunger shaft having a top end and a bottom end, wherein the plunger shaft is configured to move vertically with respect to the carafe through the hole in the lid;
        wherein the hole or the plunger shaft has a helical feature that mates with a corresponding feature of the plunger shaft or of the hole, respectively;
        wherein the helical feature and the corresponding feature are configured to rotate the plunger shaft when the plunger shaft moves vertically with respect to the carafe through the hole in the lid;
    a froth spoon having
        at least a semi-oval plate coupled with the plunger shaft, and
        a shaft having a top end and a bottom end;
            wherein the plunger shaft protrudes through the hole in the lid;
            wherein the semi-oval plate is configured to fit within the interior surface of the carafe; and
            wherein the froth spoon is configured to move vertically with respect to the carafe when the plunger shaft is moved vertically;
    a cross plate having a top side, a bottom side, and at least one impeller;
        wherein the at least one impeller protrude from the bottom side of the cross plate;
        wherein the plunger shaft is configured to rotate horizontally with respect to the carafe to allow the at least one impeller to agitate the contents of the carafe;
        wherein the froth spoon further comprises a slit to allow the froth spoon to be removed from the plunger shaft or wherein the froth spoon further comprises a central hole to allow the froth spoon to move vertically along the plunger shaft or wherein the froth spoon comprises the slit and the central hole;

a spring;

a filter screen coupled with the cross plate and further coupled with the spring to provide a seal between the filter screen and the carafe; and a perforated plate coupled with the filter screen.

15. The coffee making apparatus with a froth spoon and at least one impeller of claim 14, wherein the at least one impeller comprises a plurality of impellers.

16. The coffee making apparatus with a froth spoon and at least one impeller of claim 14, wherein the plunger shaft is threaded on the bottom end and has a grip on the top end.

17. The coffee making apparatus with a froth spoon and at least one impeller of claim 14, wherein the lid seals on top of the carafe to keep the contents inside of the carafe during use.

18. The coffee making apparatus with a froth spoon and at least one impeller of claim 14, wherein the plunger shaft further comprises a shoulder and a retention nut that hold the cross plate, the filter screen, and the perforated plate together on the bottom end of the plunger shaft.

19. The coffee making apparatus with a froth spoon and at least one impeller of claim 14, wherein the carafe is held by a sleeve made of an insulative material shaped to conform to the exterior surface of the carafe with a handle, that closely fits around the carafe.

20. The coffee making apparatus with a froth spoon and at least one impeller of claim 14, wherein the spring compresses the filter screen against the interior surface of the carafe.

* * * * *